US012732891B2

(12) United States Patent
Balmakhtar et al.

(10) Patent No.: US 12,732,891 B2
(45) Date of Patent: Sep. 8, 2026

(54) PRIVILEGE ISOLATION IN MANAGED COMMUNICATION SERVICE

(71) Applicant: T-Mobile Innovations LLC, Overland Park, KS (US)

(72) Inventors: Marouane Balmakhtar, Fairfax, VA (US); Lyle W. Paczkowski, Mission Hills, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 319 days.

(21) Appl. No.: 18/402,332

(22) Filed: Jan. 2, 2024

(65) Prior Publication Data

US 2025/0220553 A1 Jul. 3, 2025

(51) Int. Cl.

*H04W 48/06* (2009.01)
*H04L 41/14* (2022.01)
*H04L 41/5009* (2022.01)
*H04W 24/08* (2009.01)

(52) U.S. Cl.

CPC ............. *H04W 48/06* (2013.01); *H04L 41/14* (2013.01); *H04L 41/5009* (2013.01); *H04W 24/08* (2013.01)

(58) Field of Classification Search

CPC ..... H04L 41/14; H04L 41/5009; H04W 48/06
See application file for complete search history.

(56) References Cited

U.S. PATENT DOCUMENTS 8,385,199 B1 * 2/2013 Coward .................. H04L 47/22 370/230.1
2005/0190765 A1 * 9/2005 Gotoh ..................... H04L 45/16 370/432
2008/0089233 A1 * 4/2008 Shimojo ................ H04L 41/00 370/236
2013/0077486 A1 * 3/2013 Keith .................. H04L 47/2433 370/230.1
2014/0149262 A1 * 5/2014 Parekh ................ H04L 43/0882 709/224
2016/0044693 A1 * 2/2016 Sun ......................... H04W 4/90 370/336
2019/0245868 A1 * 8/2019 Patil .................... H04L 63/1466
2020/0117489 A1 * 4/2020 Borkar .................... G06F 9/452
2020/0328803 A1 * 10/2020 Cooke ................... H04W 36/26
2022/0346169 A1 * 10/2022 Polepalli ............... H04W 88/16

* cited by examiner

*Primary Examiner* — Kenny S Lin

(57) ABSTRACT

A managed communication service system to restrict communication in a network based on a privilege associated to a context of the communication to provide privilege isolation. The managed communication service system comprises a processor; a memory; and an application stored in the memory that, when executed by the processor, is configured to monitor network traffic associated with the managed communication service system, determine a context of the managed communication service system based on monitoring the network traffic associated with the managed communication service system, restrict a first communication session provided by the managed communication service system based on the context to a first combination of communication privilege parameters, and restrict a second communication session provided by the managed communication service system based on the context to a second combination of communication privilege parameters.

20 Claims, 7 Drawing Sheets

PRIVILEGE ISOLATION IN MANAGED COMMUNICATION SERVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Managed communication services can be provided by communication service providers to enterprise communication service subscribers to achieve communication performance goals or requirements defined by the enterprise. A managed communication service may delegate communication network configuration details and decisions to the communication service providers who may know better how to satisfy the communication performance goals of the enterprise than would employees of the enterprise, especially in a context of rapid communication network technological change.

SUMMARY

In an embodiment, a managed communication service system to restrict communication in a network based on a privilege associated to a context of the communication to provide privilege isolation is disclosed. The managed communication service system comprises a processor, a memory, and an application stored in the memory. When executed by the processor, the application is configured to monitor network traffic associated with the managed communication service system and determine a context of the managed communication service system based on monitoring the network traffic associated with the managed communication service system. The application is further configured to restrict a first communication session provided by the managed communication service system based on the context to a first combination of communication privilege parameters and restrict a second communication session provided by the managed communication service system based on the context to a second combination of communication privilege parameters.

In another embodiment, a method of providing privilege isolation by a managed communication service is disclosed. The method comprises monitoring, by an application executing on a computer system, traffic in a managed communication service channel, wherein the managed communication service channel includes a first secure tunnel and determining at a first time by the application that traffic in the managed communication service channel has increased above a threshold based on monitoring traffic in the managed communication service channel. The method further comprises, in response to determining that traffic in the managed communication service channel has increased above the threshold, establishing a second secure tunnel in the managed communication service channel by the application and directing by the application some of the traffic in the managed communication service channel into the second secure tunnel, wherein communication privileges provided to traffic in the first secure tunnel are different from the communication privileges provided to traffic in the second secure tunnel. The method further comprises determining at a second time by the application that a security threat level has increased above a threshold by the application based on monitoring traffic in the managed communication service channel and, in response to determining that the security threat level has increased above the threshold, changing a cyptographic method used by the first secure tunnel, whereby the security of the first secure tunnel is increased.

In yet another embodiment, another method of providing privilege isolation by a managed communication service is disclosed. The method comprises receiving definitions of desired communication service performance from a communication service subscriber associated with the managed communication service by an application executing on a computer system; monitoring continuously, by the application, traffic in a managed communication service channel; and providing the managed communication service channel by a communication network, wherein the managed communication service channel comprises a plurality of communication sessions of the communication service subscriber, wherein at least some of the communication sessions are provided with different communication privileges. The method further comprises determining actual communication service performance of the managed communication service channel by the application based on monitoring continuously the traffic in the managed communication service channel; comparing the actual communication service performance of the managed communication service channel by the application to the desired communication service performance defined by the communication service subscriber; and, when the application determines the actual communication service performance does not achieve the desired communication service performance defined by the communication service subscriber, adapting by the application the network resources provided to the managed communication service channel based on the determination that actual communication service performance does not achieve the desired communication service performance.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
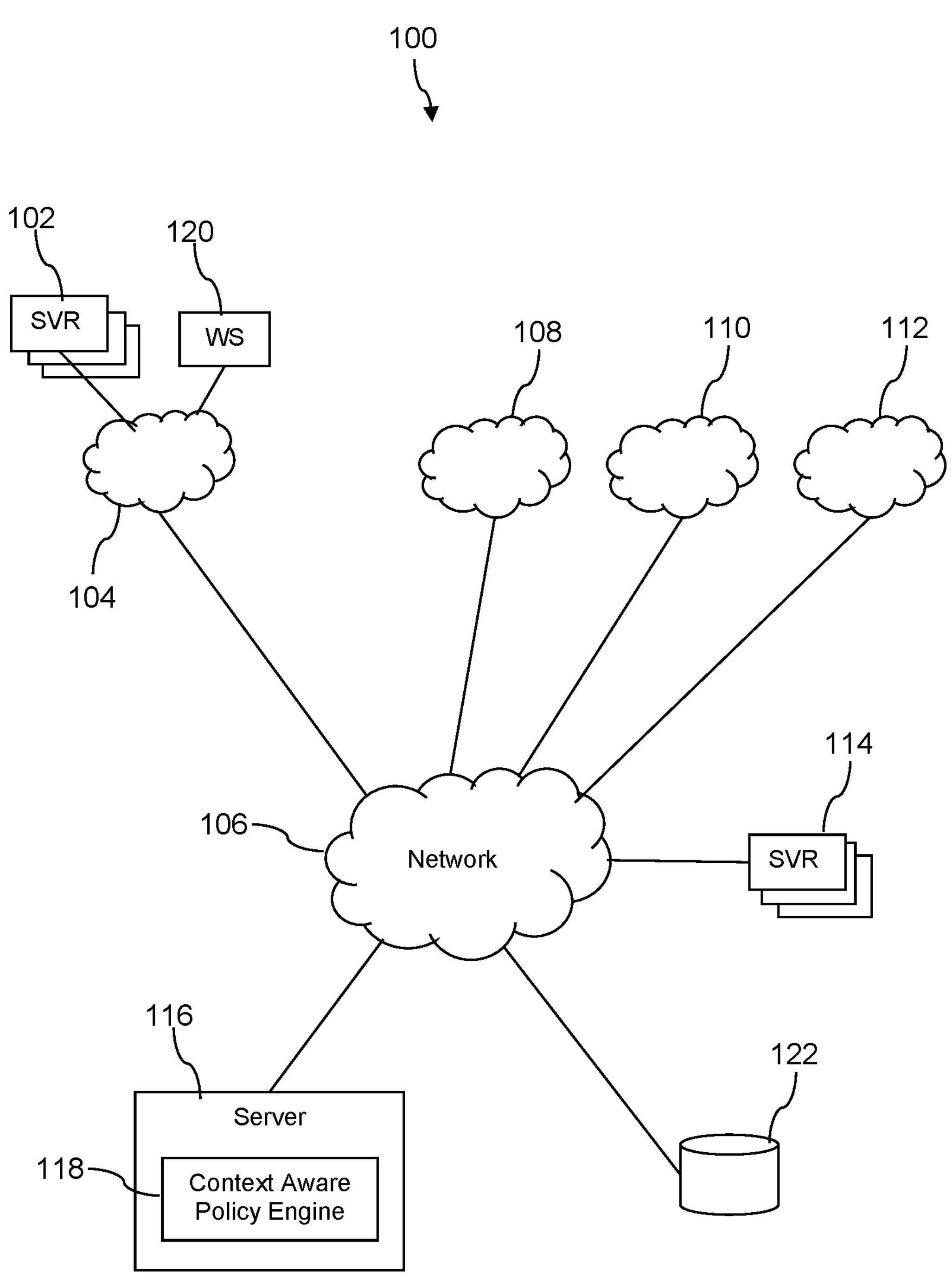
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Traffic carried by communication service providers is increasingly machine-to-machine communication. For example, enterprises may engage in high volume communication traffic with major third-party cloud computing systems. The enterprise to macro cloud communication traffic may be carried in one bulk communication channel by the communication service provider. But this has various drawbacks from a security perspective and from a network efficiency perspective. In this bulk communication channel circumstance all communications may be granted plenipotentiary communication privileges, even when some communication sessions in the channel only need minimum communication privileges to succeed. This runs contrary to the security principle of granting the minimum privilege required to complete a given communication task and therefore increases communication security risks. The present disclosure teaches a managed communication service system that provides privilege isolation between different communications between two communication endpoints.

A context aware policy engine is taught herein that monitors communication in a managed communication service channel. The context aware policy engine analyzes performance metrics of the channel to determine if actual communication service performance meets definitions of desired communication service performance stipulated by an associated communication service subscriber (e.g., an enterprise communication service subscriber). If desired communication service performance is not achieved, the context aware policy engine can adapt the operational parameters of the channel to improve communication performance. For example, the context aware policy engine can allocate additional communication resources within the channel, for example establish additional secure tunnels within the channel. In association with the newly added communication resources, the context aware policy engine may redirect or reroute on-going communications in the channel and/or route new communications in the channel to the newly added communication resources.

The context aware policy engine can also implement security measures within the managed communication service channel. This can involve determining a type of communication session being initiated and allocating the minimum communication privileges consistent with successfully completing that type of communication session. This can involve constraining endpoint addresses that the originating device can connect to. This can involve constraining a data throughput rate supported to the communication session. The context aware policy engine can support different levels of communication privileges for different communication sessions taking place in the same managed communication service channel.

The context aware policy engine can adapt security measures dynamically in response to evaluating a current cyber security threat level that changes over time—either going up or coming down. The context aware policy engine may receive cyber security threat level indications from a threat evaluation platform within the communication service provider network or from a third-party evaluation platform outside of the communication service provider network. The context aware policy engine, for example, may change a cryptographic method used to encrypt communications on different communication sessions in the managed communication channel to make the encrypted communication more difficult to decrypt (trading off communication efficiency for enhanced security when a threat level is high) or to make or to make encrypted communication easier to decrypt (gaining communication efficiency in exchange for reduced security when a threat level is low). The context aware policy engine may broker more frequent changes of encryption keys in a high threat condition and less frequent changes of encryption keys in a low threat condition.

The context aware policy engine can establish multiple independent communication paths from a router in communication with the enterprise to a router in communication with a communication endpoint such as a macro cloud computing system, where traffic from endpoint A to endpoint B travels through a first route path and traffic from endpoint B to endpoint B travels through a second different route path. The context aware policy engine can establish multiple different routes from endpoint A to endpoint B and/or multiple different routes from endpoint B to endpoint A. This can involve splitting individual communication sessions between two different routes. Such splitting communication over different routes is a security enhancement strategy that is aimed at making it more difficult for malefactors from intercepting and decrypting traffic. The context aware policy engine can dynamically initiate such route diversity and/or increase the level of route diversity in response to an increased threat level. Likewise, the context aware policy engine can dynamically reduce and simplify route diversity in response to a decreased threat level.

The context aware policy engine can analyze data collected on the traffic in the communication sessions within the managed communication service channel and take action accordingly. For example, if the traffic of a given communication session exhibits an anomalous pattern, the context aware policy engine can detect this anomaly and change the security restrictions on that communication session, throttle down the data throughput of that communication session, increase the level of encryption hardness of the communication session, increase the route diversity of the communication session, or shutdown the communication session entirely.

The context aware policy engine can apply these management actions on the managed communication service channel without the direct involvement of the enterprise. The context aware policy engine, once the enterprise has defined the parameters of managing the enterprise's communications in the managed communication service channel, can adapt and modify the communication operations of the managed communication service channel to achieve the communication objectives defined by the enterprise. This provides advantages of relieving the enterprise of making these changes itself. Additionally, it is likely the communication service provider understands how to achieve the communication objectives of the enterprise better than the enterprise does itself, because the communication service provider better understands the capabilities of its own network. The context aware policy engine taught herein provides a specific technical solution to a problem rooted in computer technology—the complex, high volume machine-to-machine communications between enterprises and external systems.

Turning now to FIG. 1, a system 100 is described. In an embodiment, system 100 comprises one or more enterprise servers 102, an enterprise private network 104, and a network 106. The network 106 comprises one or more public networks, one or more private networks, or a combination thereof. At least part of the network 106 is operated by a communication service provider that provides communication subscription services to the enterprise private network 104, for example provides a managed communication service to the enterprise in accordance with a subscription arrangement. The servers 102 may communicate via the enterprise private network 104 and the network 106 with one or more macro cloud computing systems, for example a first macro cloud 108, a second macro cloud 110, and a third macro cloud 112. The servers 102 may communicate via the enterprise private network 104 and the network 106 with one or more external servers 114, external to the enterprise private network 104 and unassociated with the enterprise. While a single enterprise private network 104 and set of enterprise servers 102 is depicted in FIG. 1, it is understood that the system 100 may comprise a plurality of enterprise private networks and a plurality of enterprise servers connected to the network 106 via each of the plurality of enterprise private networks.

Figure 2:
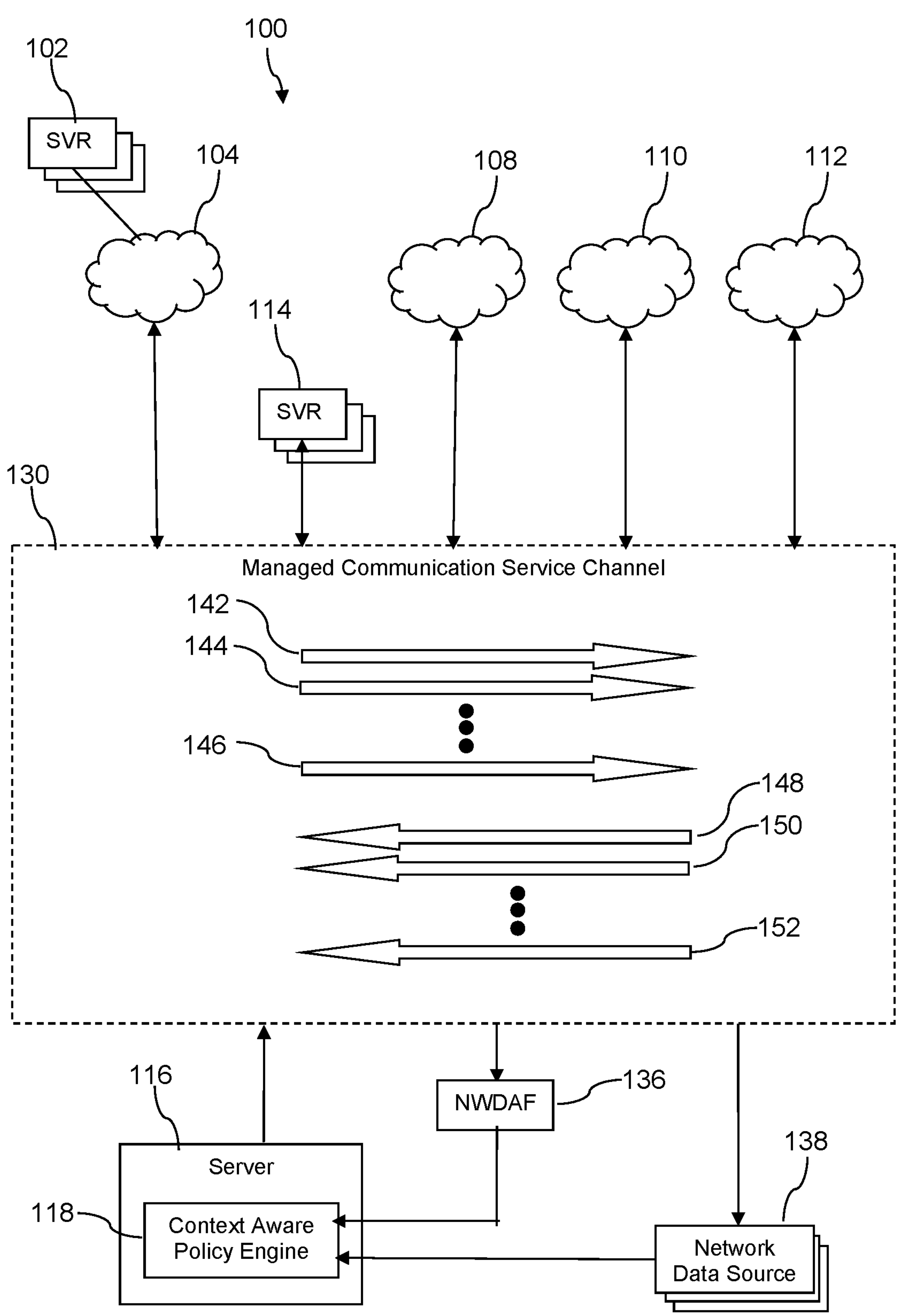
FIG. 2 is a block diagram of a managed communication service according to an embodiment of the disclosure.

The system 100 comprises a server 116 that executes a context aware policy engine 118. The context aware policy engine 118 may receive definitions of desired communication service performance from an enterprise workstation 120. In some contexts, the desired communication service performance definitions may be collectively referred to as a service level agreement (SLA). The desired communication service performance definitions may be more extensive than typical SLAs that only relate to communication performance metrics such as data throughput rate, jitter, and latency. Here the desired communication service performance definitions extend beyond these metrics to include other aspects of the managed communication service provided by the context aware policy engine 118 to the communications of the enterprise, for example including security policies and rules and thresholds for adapting these security policies applied by the context aware policy engine 118. In some contexts, the desired communication service performance definitions may be referred to as communication service specifications or communication service expectations or communication service requirements. The context aware policy engine 118 may store these desired communication service performance definitions in a data store 122. Portions of the system 100 may be said to comprise a managed communication service system, for example the server 116, the context aware policy engine 118, and the data store 122. With reference to FIG. 2 below, in an embodiment, the NWDAF 136 may also be considered to comprise part of the managed communication service system. With reference to FIG. 2 below, in an embodiment, the one or more network data sources 138 may be considered to comprise part of the managed communication service system.

Turning now to FIG. 2, an abstract view of a managed communication service channel 130 is described. The context aware policy engine 118 may establish the managed communication service channel 130, for example by configuring and/or provisioning communication nodes in the network 106 and dynamically adapting and adjusting the configurations and provisioning of those nodes. The enterprise servers 102 may engage in one-way and/or two-way communication with external servers 114 and/or one or more of the macro clouds 108, 110, 112. It is understood that the communication between the enterprise servers 102 via the enterprise cloud 104 via the managed communication service channel 130 (carried at least in part by network 106 of FIG. 1) with the external servers 114 and/or macro clouds 108, 110, 112 may comprise hundreds, thousands, or tens of thousands of concurrent communication sessions. Only a few communication sessions are illustrated in FIG. 2 to avoid overly congesting and confusing the drawing.

In an embodiment, a first communication route 142 flows communication traffic from the enterprise cloud 104 to one of the external servers 114 or macro clouds 108, 110, 112; a second communication route 144 flows traffic from the enterprise cloud 104 to one of the external servers 114 or macro clouds 108, 110, 112; and a third communication route 146 flows traffic from the enterprise cloud 104 to one of the external servers 114 or macro clouds 108, 110, 112. In an embodiment, a fourth communication route 148 flows traffic from one of the external servers 114 or macro clouds 108, 110, 112 to the enterprise cloud 104; a fifth communication route 150 flows traffic from one of the external servers 114 or macro clouds 108, 110, 112 to the enterprise cloud 104; and a sixth communication route 152 flows traffic from one of the external servers 114 or macro clouds 108, 110, 112 to the enterprise cloud 104. It is understood that any number of communication sessions may be on-going concurrently in the managed communication service 130.

In an embodiment, the communication routes 142-152 may support only one-way flow of traffic, whereby to increase cyber security of the managed communication service 130. Segregating communication traffic in a communication session between two communication endpoints bound in a first direction in the managed communication service channel 130 from communication traffic between the same two communication endpoints bound in the opposite direction by using difference communication routes may increase the difficulty of malefactors to access the communication, in that in many cases sense cannot be made of the communication session unless both communication flows are intercepted and understood together. In an embodiment, a single communication session between two endpoints may be segregated into two or more communication routes in a first direction and/or two or more communication routes in the opposite direction, whereby to further increase the difficulty of intercepting and making sense of the end-to-end communication. Some communication routes in the managed communication service channel 130, however, may carry communication traffic in both directions. For example, some communication sessions may be treated with a different security policy and/or communication performance policy by the context aware policy engine 118 based on a different communication context between different communication sessions.

The communication ingress/egress nodes of the managed communication service channel 130 may consolidate the segregated communication routes whereby to allow the enterprise network 104, the servers 114, and the macro clouds 108, 110, 112 to handle the communication sessions in the customary way. For example, a router connecting the enterprise network 104 to the managed communication service channel 130 may reassemble communication traffic associated with a communication session from multiple routes inside the managed communication service channel 130 to a single route from the managed communication service channel 130 to the enterprise network 104 and may segregate communication traffic of the same communication session into multiple different routes when sending the traffic from the enterprise network 104 into the managed communication service channel 130. Likewise, a router connecting the first macro cloud 108 to the managed communication service channel 130 may reassemble communication traffic associated with the same communication session from multiple routes inside the managed communication service channel 130 to a single route from the managed communication service channel 130 to the first macro cloud 108 and may segregate communication traffic of the same communication session into multiple different routes when sending the traffic from the macro cloud 108 into the managed communication service channel 130. A route may be considered a pathway through the network 106 involving a number of links between different communication nodes or routers, where a different route involves passage of the communication through a different sequence of nodes or routers. It is understood that the communication of the communication sessions over the routes 142-152 may be packetized data communication, where each packet comprises a header portion and a data content portion. In an embodiment, the communication sessions may be transport control protocol (TCP) communication sessions and the packets may be Internet protocol (IP) packets. In another embodiment, the communication sessions may not be connection-oriented (connection concept not constructed by the network 106 or by the managed communication service channel 130) and may be User Datagram Protocol (UDP) with IP packets.

The context aware policy engine 118 may establish and adapt the managed communication service channel 130 by configuring and provisioning modes in the network 106. In an embodiment, the network 106 is a 5G network, and the context aware policy engine 118 may establish and adapt the managed communication service channel 130 by configuring and provisioning virtual functions provided by the 5G network. The 5G network is described further hereinafter with reference to FIG. 5A and FIG. 5B. While the managed communication service system and context aware policy engine 118 described herein has applicability in 5G networks, it is understood that these may also provide benefits and find application in post-5G networks.

The context aware policy engine 118 monitors communication traffic in the managed communication service channel 130 and other relevant information such as general cyber security threat level in a region or country. Indications of a cyber security threat level may be provided to the context aware policy engine 118 from a third-party source, such as an industry-wide security monitoring agency or organization. In an embodiment, the context aware policy engine 118 monitors communication traffic directly (e.g., receives a feed of information from network communication nodes or retrieves such information from a dump of a feed of information from network communication nodes into a data store) to derive metrics and key performance indicators (KPIs) of the traffic. Alternatively, in another embodiment, a network data analysis function (NWDAF) 136 monitors the communication traffic in the managed communication service channel 130, analyzes the traffic to derive metrics and KPIs of the traffic, and sends the metrics and KPIs to the context aware policy engine 118. In an embodiment, one or more other network data sources 138 may collect data about the managed communication service channel 130 and/or the enterprise private network 104, for example operation measurements, performance measurements, and other measurements, and provide this data to the context aware policy engine 118. In an embodiment, the NWDAF 136 and/or other network data source 138 stores information on communication traffic in the managed communication service channel 130 in the data store 122, and the context aware policy engine 118 reads the information on traffic data and traffic KPIs from the data store 122. The context aware policy engine 118 may receive other relevant information, for example cyber security threat assessments, from other sources external to the network 106. The context aware policy engine 118 can use the communication traffic metrics and KPIs and cyber security threat level assessments to dynamically adapt the managed communication service channel 130 responsive to the communication context constituted by these KPIs, cyber security threat level assessments, and other relevant information.

The context aware policy engine 118 can cause the network 106 and/or the managed communication service channel 130 to treat different communication sessions between endpoints (e.g., between the enterprise network 104 and servers 114 and/or macro clouds 108, 110, 112) with different communication privileges, for example maintaining the minimum privilege principle whereby communication sessions are granted the minimum access permissions needed to successfully complete the communication associated to the given communication session.

It is understood that the system 100 can support and establish multiple independent and concurrent managed communication service channels 130. For example, the system 100 may provide a first managed communication service channel 130 between a first enterprise network and the servers 114 and macro clouds 108, 110, 112 and may provide a second managed communication service channel 130 between a second enterprise network and the servers 114 and macro clouds 108, 110, 112. In this way, the managed communication service channel of the first enterprise is decoupled from and independent from the managed communication service channel of the second enterprise. In an embodiment, a single context aware policy engine 118 may establish two, three, four, or a larger number of separate managed communication service channels 130. Alternatively, each different managed communication service channel 130 may be established and maintained by different instantiations of the context aware policy engine 118, whereby to increase separation and security between different managed communication service channels 130.

Figure 3:
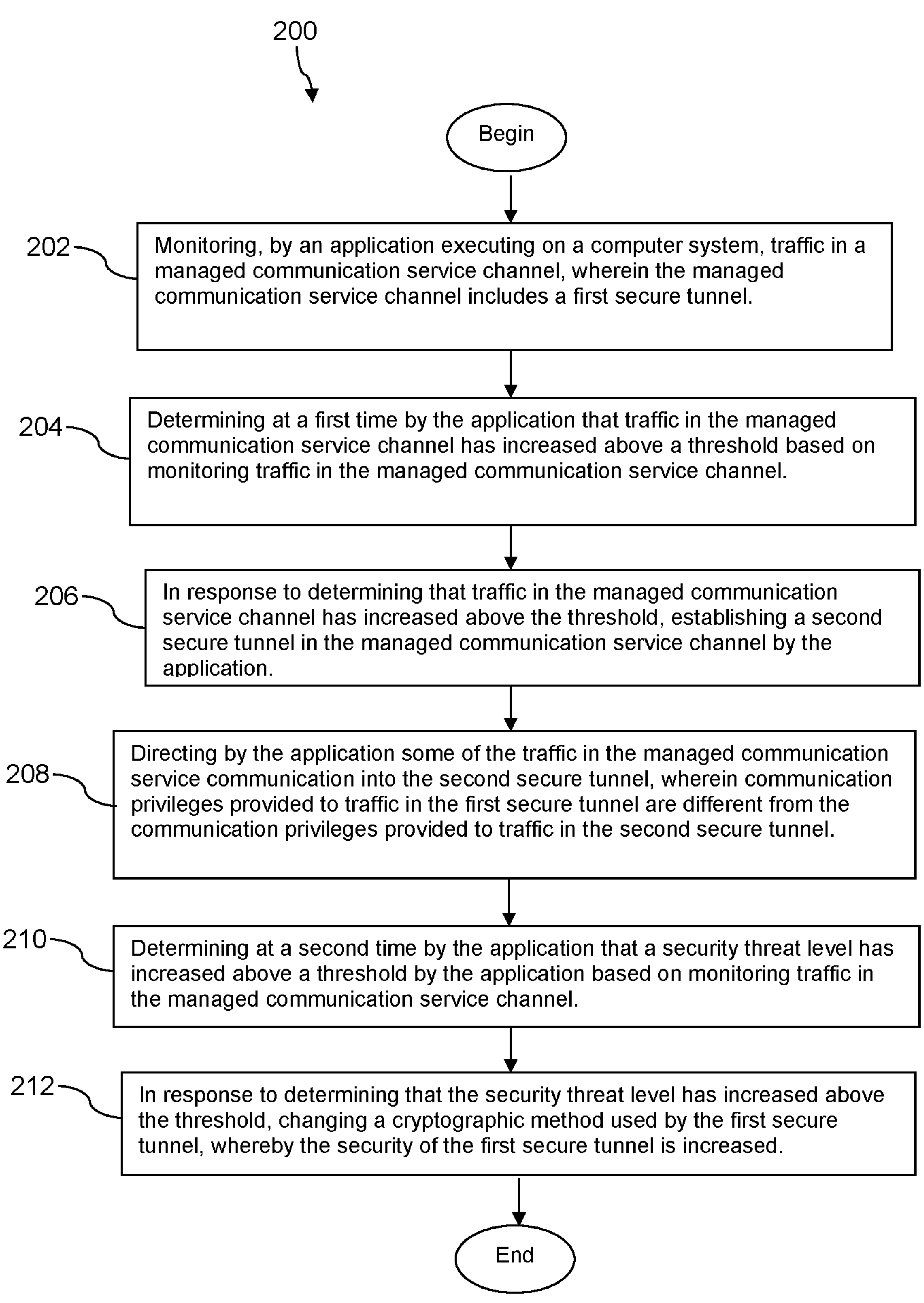
FIG. 3 is a flow chart of a method according to an embodiment of the disclosure.

Turning now to FIG. 3, a method 200 is described. In an embodiment, method 200 is a method of providing privilege isolation by a managed communication service. At block 202, method 200 comprises monitoring, by an application executing on a computer system, traffic in a managed communication service channel, wherein the managed communication service channel includes a first secure tunnel. In an embodiment, the first secure tunnel carries traffic between an enterprise network and a macro cloud. In an embodiment, the method 200 comprises receiving information on traffic in the managed communication service channel from a network data analysis function (NWDAF), for example a NWDAF provided by a 5G network that supports the managed communication service channel. At block 204, method 200 comprises determining at a first time by the application that traffic in the managed communication service channel has increased above a threshold based on monitoring traffic in the managed communication service channel.

At block 206, method 200 comprises, in response to determining that traffic in the managed communication service channel has increased above the threshold, establishing a second secure tunnel in the managed communication service channel by the application. At block 208, method 200 comprises directing by the application some of the traffic in the managed communication service channel into the second secure tunnel, wherein communication privileges provided to traffic in the first secure tunnel are different from the communication privileges provided to traffic in the second secure tunnel.

At block 210, method 200 comprises determining at a second time by the application that a security threat level has increased above a threshold by the application based on monitoring traffic in the managed communication service channel. At block 212, method 200 comprises, in response to determining that the security threat level has increased above the threshold, changing a cryptographic method used by the first secure tunnel, whereby the security of the first secure tunnel is increased. In an embodiment, the security of the first secure tunnel is increased by changing the cryptographic method to a more secure cryptographic method. In an embodiment, the security of the first secure tunnel is increased by increasing the frequency at which a cryptographic key used to provide the first secure tunnel is changed. In an embodiment, the security of the first secure tunnel is increased by using an encryption key having more digits than a previously active encryption key. In an embodiment, the security of the first secure tunnel is increased by segregating the communication traffic in the first secure tunnel into a larger number of routes.

Figure 4:
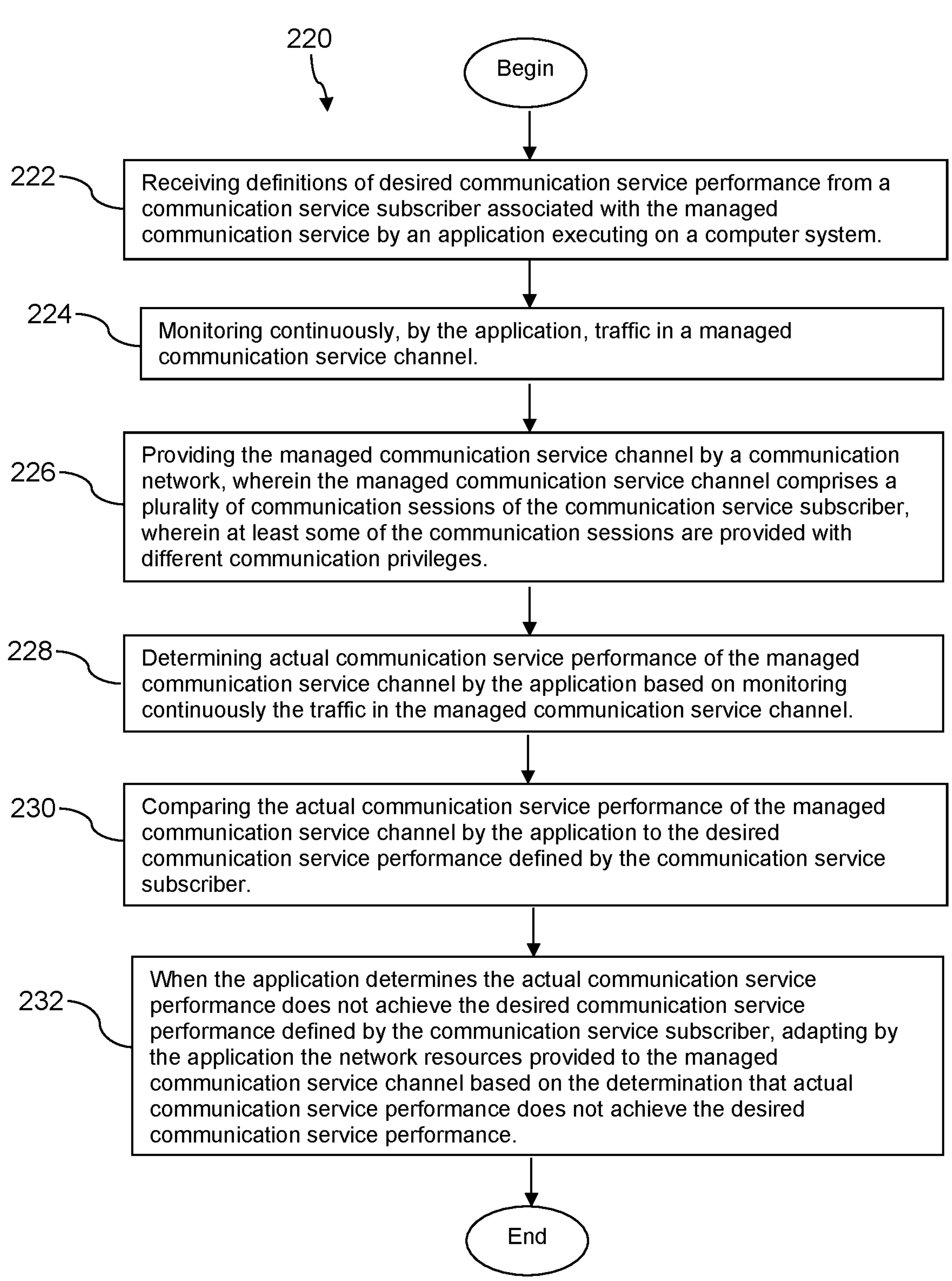
FIG. 4 is a flow chart of another method according to an embodiment of the disclosure.

Turning now to FIG. 4, a method 220 is described. In an embodiment, method 220 is a method of providing privilege isolation by a managed communication service. At block 222, method 220 comprises receiving definitions of desired communication service performance from a communication service subscriber associated with the managed communication service by an application executing on a computer system. In an embodiment, the definitions of desired communication service performance comprise desired security rules. In an embodiment, the definitions of desired communication service performance comprise communication access levels associated with different types of communication content.

At block 224, method 220 comprises monitoring continuously, by the application, traffic in a managed communication service channel. In an embodiment, the application monitors traffic in the managed communication service channel by receiving traffic key performance indicators (KPIs) from a network data analysis function (NWDAF) provided by the 5G network.

At block 226, method 220 comprises providing the managed communication service channel by a communication network, wherein the managed communication service channel comprises a plurality of communication sessions of the communication service subscriber, wherein at least some of the communication sessions are provided with different communication privileges. At block 228, method 220 comprises determining actual communication service performance of the managed communication service channel by the application based on monitoring continuously the traffic in the managed communication service channel.

At block 230, method 220 comprises comparing the actual communication service performance of the managed communication service channel by the application to the desired communication service performance defined by the communication service subscriber. At block 232, method 220 comprises when the application determines the actual communication service performance does not achieve the desired communication service performance defined by the communication service subscriber, adapting by the application the network resources provided to the managed communication service channel based on the determination that actual communication service performance does not achieve the desired communication service performance. In an embodiment, the application adapts the network resources provided by the managed communication service channel by sending messages with provisioning or configuration parameters to one or more network functions of a 5G network that supports the managed communication service channel. In an embodiment, the actual communication service performance falls short of the desired communication service performance defined by the communication service subscriber in a level of security provided by the managed communication service channel based on an increased cyber security threat level indication and wherein adapting the network resources provided to the managed communication service channel in response to determining that actual communication service performance does not achieve the desired communication service performance comprises increasing an encryption key complexity.

Figure 5A:
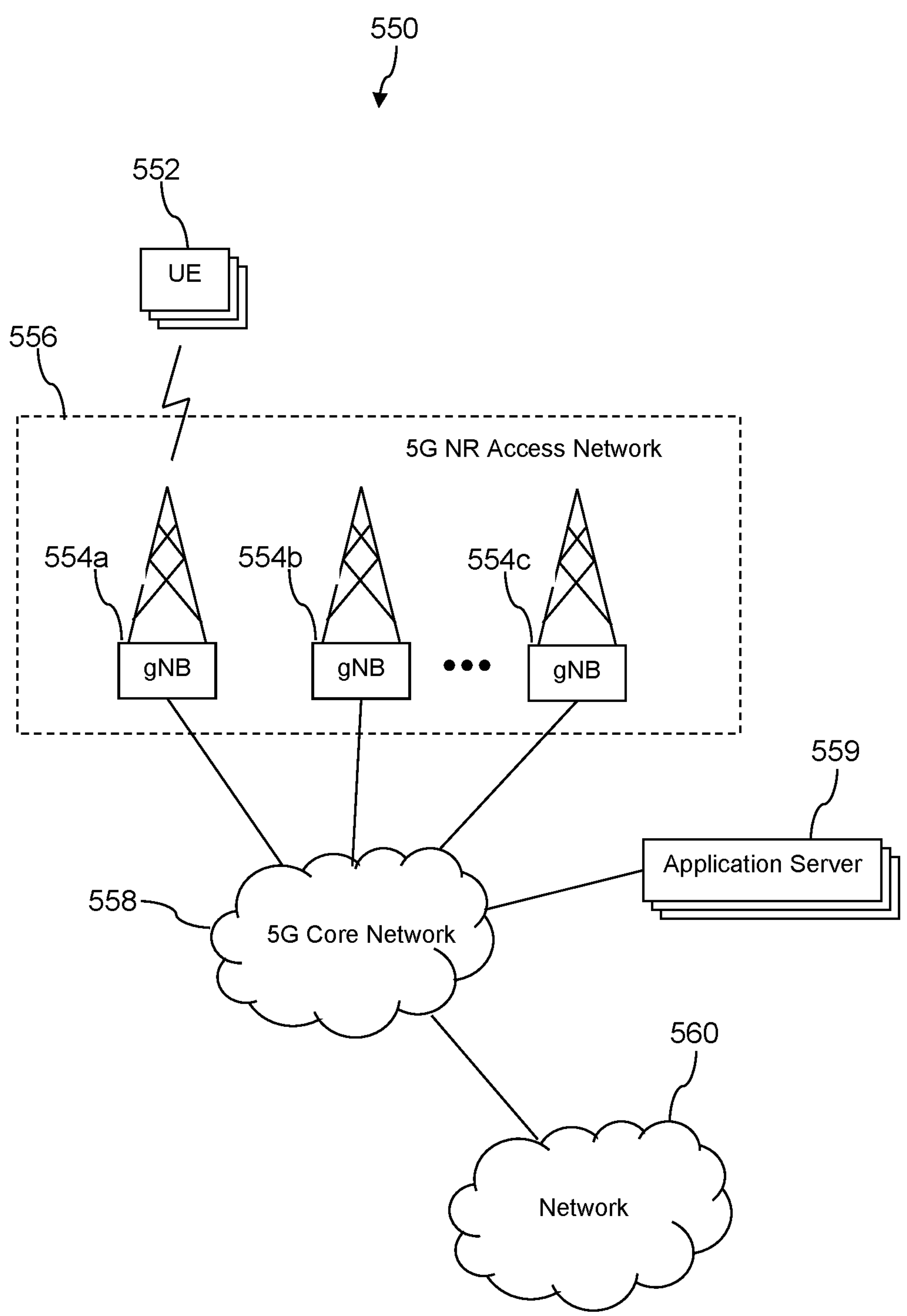
FIG. 5A and FIG. 5B are block diagrams of a communication network according to an embodiment of the disclosure.

Turning now to FIG. 5A, an exemplary communication system 550 is described. Typically, the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long-term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554*a*, a second access node 554*b*, and a third access node 554*c*. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long-Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 5B:
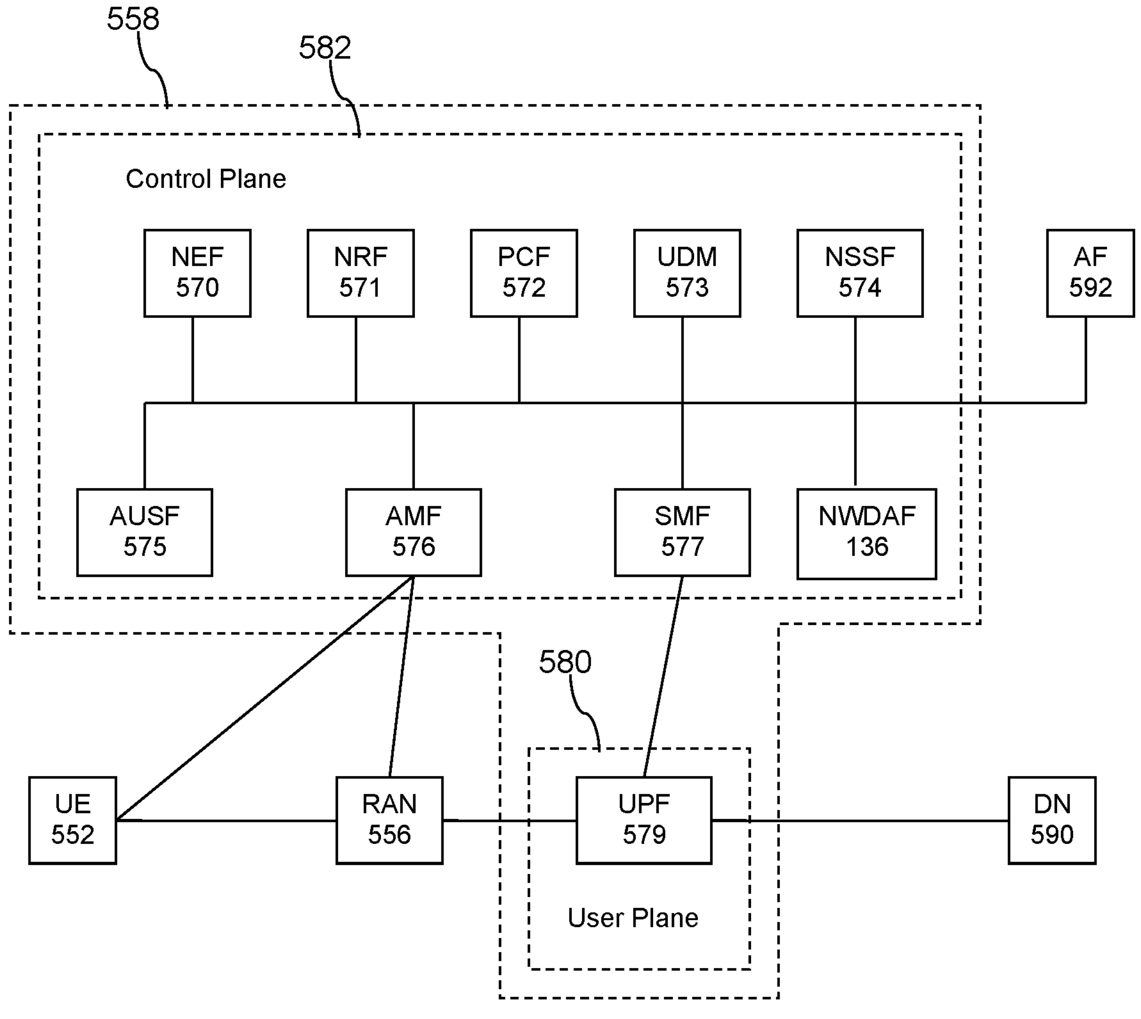

Turning now to FIG. 5B, further details of the core network 558 are described. In an embodiment, the core network 558 is a 5G core network. 5G core network technology is based on a service-based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 5A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow-based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6:
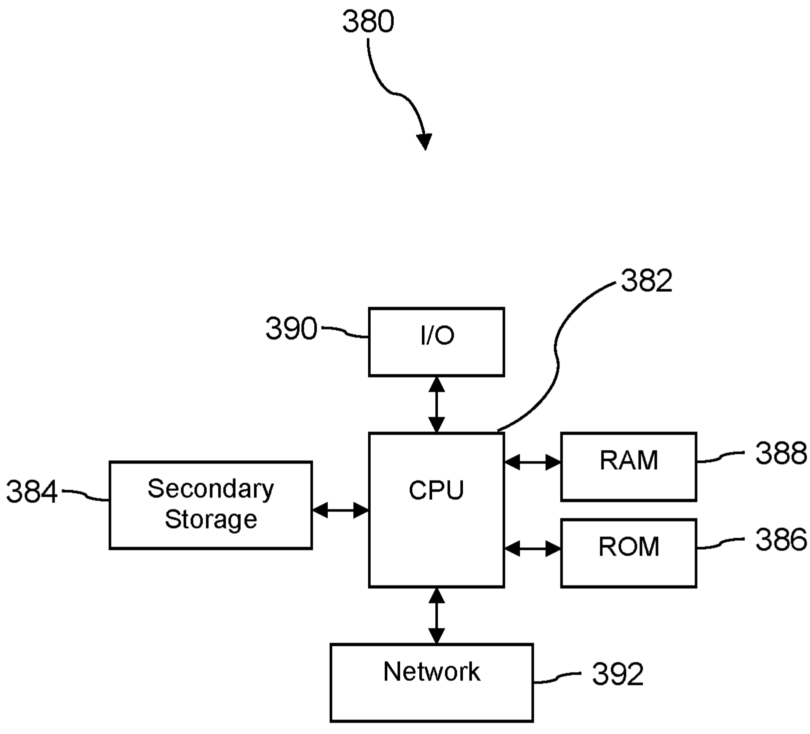
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A managed communication service system to restrict communication in a network based on a privilege associated to a context of the communication to provide privilege isolation, comprising:

a processor;

a memory; and an application stored in the memory that, when executed by the processor, is configured to:

monitor network traffic associated with the managed communication service system, determine a context of the managed communication service system based on monitoring the network traffic associated with the managed communication service system, restrict a first communication session provided by the managed communication service system based on the context to a first combination of communication privilege parameters, and restrict a second communication session provided by the managed communication service system based on the context to a second combination of communication privilege parameters.

2. The managed communication service system of claim 1, wherein the application monitors the network traffic associated with the managed communication service system from a network data analysis function (NWDAF).

3. The managed communication service system of claim 1, wherein the application monitors the network traffic associated with the managed communication service system by accessing a data store that stores data on the network traffic associated with the managed communication service system.

4. The managed communication service system of claim 1, wherein the application receives an indication of a cyber threat level, and wherein the application determines the context of the managed communication service system at least in part based on the indication of cyber threat level.

5. The managed communication service system of claim 1, wherein the first communication session carries a first type of communication traffic and the second communication session carries a second type of communication traffic that is different from the first type of communication traffic, and wherein the context of the managed communication service system comprises the types of communication the first and second communication sessions are engaged in.

6. The managed communication service system of claim 1, wherein the first communication session is provided by a first virtual private network (VPN) tunnel and the second communication session is provided by a second VPN tunnel, and wherein the communication privileges associated with the first VPN tunnel are different from the communication privileges associated with the second VPN tunnel.

7. The managed communication service system of claim 1, wherein the application adapts the restriction of the first communication session based on changing context of the managed communication service system.

8. The managed communication service system of claim 1, wherein the application is further configured to:

monitor traffic in a managed communication service channel, wherein the managed communication service channel includes a first secure tunnel, determine that traffic in the managed communication service channel has increased above a threshold, and in response to determining that traffic has increased above the threshold, establish a second secure tunnel in the managed communication service channel and direct some of the traffic in the managed communication service channel into the second secure tunnel, wherein communication privileges provided to traffic in the first secure tunnel are different from the communication privileges provided to traffic in the second secure tunnel.

9. The managed communication service system of claim 8, wherein the first secure tunnel carries traffic between an enterprise network and a macro cloud.

10. The managed communication service system of claim 1, wherein the application is further configured to:

determine that a security threat level has increased above a threshold based on monitoring the network traffic associated with the managed communication service system, and in response to determining that the security threat level has increased above the threshold, change a cryptographic method used by a secure tunnel of the managed communication service system to increase the security of the secure tunnel.

11. The managed communication service system of claim 10, wherein the security of the secure tunnel is increased by changing the cryptographic method to a more secure cryptographic method.

12. The managed communication service system of claim 10, wherein the security of the secure tunnel is increased by increasing the frequency at which a cryptographic key used to provide the secure tunnel is changed.

13. The managed communication service system of claim 10, wherein the security of the secure tunnel is increased by using an encryption key having more digits than a previously active encryption key.

14. The managed communication service system of claim 10, wherein the security of the secure tunnel is increased by segregating communication traffic in the secure tunnel into a larger number of routes.

15. The managed communication service system of claim 1, wherein the application is further configured to:

receive definitions of desired communication service performance from a communication service subscriber associated with the managed communication service system, continuously monitor traffic in a managed communication service channel comprising a plurality of communication sessions of the communication service subscriber, wherein at least some of the plurality of communication sessions are provided with different communication privileges, determine actual communication service performance of the managed communication service channel based on continuously monitoring the traffic, compare the actual communication service performance to the desired communication service performance, and when the actual communication service performance does not achieve the desired communication service performance, adapt the network resources provided to the managed communication service channel.

16. The managed communication service system of claim 15, wherein the definitions of desired communication service performance comprise desired security rules.

17. The managed communication service system of claim 15, wherein the definitions of desired communication service performance comprise communication access levels associated with different types of communication content.

18. The managed communication service system of claim 15, wherein the application adapts the network resources provided to the managed communication service channel by sending messages with provisioning or configuration parameters to one or more network functions of a 5G network that supports the managed communication service channel.

19. The managed communication service system of claim 18, wherein the application monitors traffic in the managed communication service channel by receiving traffic key performance indicators (KPIs) from a network data analysis function (NWDAF) provided by the 5G network.

20. The managed communication service system of claim 15, wherein the actual communication service performance falls short of the desired communication service performance in a level of security provided by the managed communication service channel based on an increased cyber security threat level indication, and wherein adapting the network resources provided to the managed communication service channel comprises increasing an encryption key complexity.

* * * * *